US012122274B2

United States Patent
Gupta et al.

(10) Patent No.: US 12,122,274 B2
(45) Date of Patent: Oct. 22, 2024

(54) VEHICLE SEAT WITH INTEGRATED TEMPERATURE-CONTROL SYSTEM

(71) Applicant: Tesla, Inc., Palo Alto, CA (US)

(72) Inventors: Gaurang Gupta, Mountain View, CA (US); Wentao Wang, Sunnyvale, CA (US); Adnan Esmail, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/444,692

(22) Filed: Aug. 9, 2021

(65) Prior Publication Data

US 2022/0097580 A1 Mar. 31, 2022

Related U.S. Application Data

(63) Continuation of application No. 16/281,500, filed on Feb. 21, 2019, now Pat. No. 11,084,404.

(Continued)

(51) Int. Cl.
*B60N 2/56* (2006.01)
*B60N 2/70* (2006.01)

(52) U.S. Cl.
CPC ......... *B60N 2/5614* (2013.01); *B60N 2/5642* (2013.01); *B60N 2/5685* (2013.01); *B60N 2/70* (2013.01)

(58) Field of Classification Search
CPC .... B60N 2/5642; B60N 2/565; B60N 2/5657; B60N 2/5664; B60N 2/5628
See application file for complete search history.

(56) References Cited

U.S. PATENT DOCUMENTS 2,912,832 A * 11/1959 Clark ................... B60N 2/5628
297/180.13
4,923,248 A 5/1990 Feher
(Continued)

FOREIGN PATENT DOCUMENTS

CN 111055738 A * 4/2020 ........... B60N 2/5657
CN 112757978 A * 5/2021
(Continued)

OTHER PUBLICATIONS

"U.S. Appl. No. 16/281,500, Examiner Interview Summary mailed Mar. 25, 2021", 2 pgs.
(Continued)

*Primary Examiner* — Timothy J Brindley
(74) *Attorney, Agent, or Firm* — Schwegman Lundberg & Woessner, P.A.

(57) ABSTRACT

A vehicle seat includes a seating portion and a backrest portion coupled to the seating portion. The seat also includes a temperature-control system associated with at least one of the seating portion and the backrest portion. The temperature-control system includes a base layer and an intermediate layer disposed adjacent to the base layer. The intermediate layer is adapted to allow fluid to flow through it. The temperature-control system includes a cover layer disposed adjacent to the intermediate layer. The temperature-control system includes at least one heating element disposed between the intermediate layer and the cover layer. The temperature-control system further includes a fluid pump to provide fluid flow through the intermediate layer.

20 Claims, 7 Drawing Sheets

Related U.S. Application Data

(60) Provisional application No. 62/647,230, filed on Mar. 23, 2018.

(56) References Cited

U.S. PATENT DOCUMENTS

| | | | | |
|---|---|---|---|---|
| 5,004,294 | A * | 4/1991 | Lin | B60N 2/5628 297/180.13 |
| 5,117,638 | A | 6/1992 | Feher | |
| 5,524,439 | A | 6/1996 | Gallup et al. | |
| 6,581,225 | B1 * | 6/2003 | Imai | A61G 7/05784 5/652.2 |
| 7,506,938 | B2 * | 3/2009 | Brennan | B60N 2/5635 297/180.13 |
| 10,889,378 | B1 * | 1/2021 | Wilson | B60N 2/5657 |
| 11,084,404 | B2 | 8/2021 | Gupta et al. | |
| 2002/0145312 | A1 | 10/2002 | Gielda et al. | |
| 2006/0214480 | A1 * | 9/2006 | Terech | B60N 2/5685 297/180.13 |
| 2008/0142494 | A1 | 6/2008 | Blake et al. | |
| 2009/0079236 | A1 * | 3/2009 | Itou | B60N 2/5642 297/180.1 |
| 2011/0109127 | A1 | 5/2011 | Park et al. | |
| 2011/0109128 | A1 * | 5/2011 | Axakov | A47C 7/744 137/561 A |
| 2015/0274048 | A1 * | 10/2015 | Mogi | B29C 44/1261 297/452.48 |
| 2016/0325655 | A1 | 11/2016 | Joshi | |
| 2016/0347217 | A1 | 12/2016 | Nishimura et al. | |
| 2017/0136926 | A1 * | 5/2017 | Dry | B60N 2/5664 |
| 2017/0164757 | A1 * | 6/2017 | Thomas | A47C 7/74 |
| 2018/0054858 | A1 | 2/2018 | Dry et al. | |
| 2018/0111527 | A1 | 4/2018 | Tait et al. | |
| 2018/0229632 | A1 | 8/2018 | Line et al. | |
| 2018/0345831 | A1 * | 12/2018 | Dry | B60N 2/5628 |
| 2018/0361894 | A1 * | 12/2018 | Wolf | B60N 2/5657 |
| 2019/0184869 | A1 * | 6/2019 | Galbreath | B60N 2/5678 |
| 2019/0241101 | A1 * | 8/2019 | Line | B60N 2/5685 |
| 2019/0291613 | A1 | 9/2019 | Gupta et al. | |
| 2019/0329683 | A1 * | 10/2019 | Beaurepaire | B60N 2/5664 |
| 2019/0371995 | A1 | 12/2019 | Tait | |
| 2019/0389346 | A1 | 12/2019 | Hayakawa et al. | |

FOREIGN PATENT DOCUMENTS

| | | | | |
|---|---|---|---|---|
| DE | 102004038458 | A1 * | 2/2006 | B60N 2/5621 |
| DE | 102009025213 | | 1/2010 | |
| DE | 102012015590 | | 2/2014 | |
| DE | 102013003673 | A1 * | 3/2014 | B60N 2/5642 |
| DE | 102014004175 | A1 * | 9/2015 | B60N 2/5642 |
| DE | 102015006924 | A1 * | 12/2015 | B60N 2/5621 |
| DE | 102015010661 | | 3/2016 | |
| DE | 102015010701 | | 3/2016 | |
| DE | 102016108732 | | 11/2016 | |
| DE | 102017216596 | A1 * | 3/2019 | B60N 2/5642 |
| DE | 102019102058 | A1 * | 7/2020 | B60N 2/01 |
| EP | 2 179 888 | | 4/2010 | |
| KR | 101673807 | B1 * | 11/2016 | |
| WO | WO-0117402 | A1 * | 3/2001 | A47C 21/044 |
| WO | WO 06/124835 | | 11/2006 | |
| WO | WO 09/003579 | | 1/2009 | |
| WO | WO 17/165484 | | 9/2017 | |
| WO | WO-2017165484 | A1 * | 9/2017 | B60N 2/5642 |
| WO | WO 19/048926 | | 3/2019 | |
| WO | WO-2019123918 | A1 * | 6/2019 | B60H 1/00285 |

OTHER PUBLICATIONS

"U.S. Appl. No. 16/281,500, Final Office Action mailed Oct. 26, 2020", 9 pgs.

"U.S. Appl. No. 16/281,500, Non Final Office Action mailed Apr. 2, 2020", 11 pgs.

"U.S. Appl. No. 16/281,500, Notice of Allowance mailed Apr. 7, 2021", 5 pgs.

"U.S. Appl. No. 16/281,500, Response filed Mar. 26, 2021 to Final Office Action mailed Oct. 26, 2020", 5 pgs.

"U.S. Appl. No. 16/281,500, Response filed Oct. 2, 2020 to Non Final Office Action mailed Apr. 2, 2020", 11 pgs.

* cited by examiner

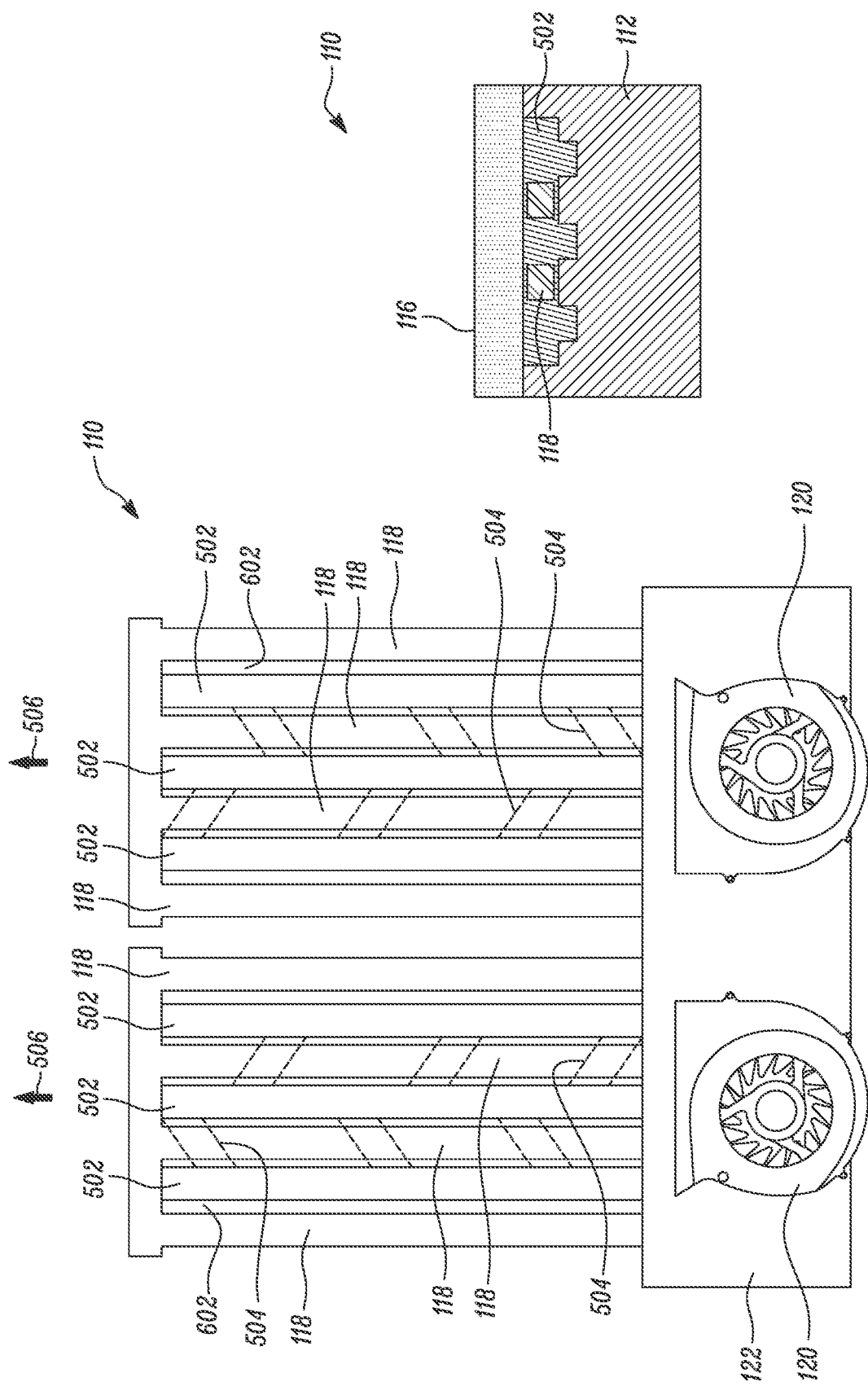

VEHICLE SEAT WITH INTEGRATED TEMPERATURE-CONTROL SYSTEM

CROSS-REFERENCES TO RELATED APPLICATIONS

This application is a continuation of U.S. application Ser. No. 16/281,500, titled "VEHICLE SEAT WITH INTEGRATED TEMPERATURE-CONTROL SYSTEM," filed on Feb. 21, 2019, which claims priority to U.S. Provisional Application No. 62/647,230, entitled "VEHICLE SEAT WITH INTEGRATED TEMPERATURE-CONTROL SYSTEM", filed Mar. 23, 2018, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

Technical Field

The present disclosure relates to a vehicle seat. More particularly, the present disclosure relates to a temperature-control system for the vehicle seat.

Description of Related Art

A vehicle, such as a sedan, a Sports Utility Vehicle (SUV), a Multi Utility Vehicle (MUV), a van, a bus, a truck, and the like, includes one or more seats to accommodate a driver and passengers. During warm and/or humid weather conditions, vehicle seats will become warm and may cause occupants to perspire, especially in areas of seat contact, creating an uncomfortable environment. Conversely, during cold weather conditions, vehicle seats can be cold, similarly creating an uncomfortable environment.

Conventional vehicle seats do not solve the aforementioned problems. Attempts to provide air ventilation through the seat foam are typically insufficient to remove excess heat and provide a comfortable environment for the occupant. Further, conventional heating systems are bulky, occupy space in the seat which typically requires the seat to be thicker, and are inefficient in heating the seat as the heat typically must travel through multiple layers and heats regions of the seat that the occupant does not contact. Hence, there is a need for an improved temperature-control system for vehicle seats.

SUMMARY

This application relates to a vehicle seat. The seat includes a seating portion and a backrest portion coupled to the seating portion. The seat also includes a temperature-control system associated with at least one of the seating portion and the backrest portion. The temperature-control system includes a base layer and an intermediate layer disposed adjacent to the base layer. The intermediate layer allows fluid to flow through it. The temperature-control system includes a cover layer disposed adjacent to the intermediate layer. The temperature-control system also includes at least one heating element disposed between the intermediate layer and the cover layer. The temperature-control system further includes a fluid pump to provide the flow of fluid through the intermediate layer.

In embodiments, a temperature-control system for a seat is provided. The temperature-control system is associated with at least one of a seating portion and a backrest portion of the seat. The temperature-control system includes a base layer. The temperature-control system includes an intermediate layer disposed adjacent to the base layer. The intermediate layer allows fluid to flow through it. The temperature-control system includes a cover layer disposed adjacent to the intermediate layer. The temperature-control system also includes at least one heating element disposed between the intermediate layer and the cover layer. The temperature-control system further includes a fluid pump to provide the flow of fluid through the intermediate layer.

BRIEF DESCRIPTION OF THE DRAWINGS

FIGS. 6A and 6B illustrate a partial top view and a partial cross-sectional view, respectively, of another portion of the temperature-control system, according to certain embodiments of the current invention.

Figures 1A, 1B:
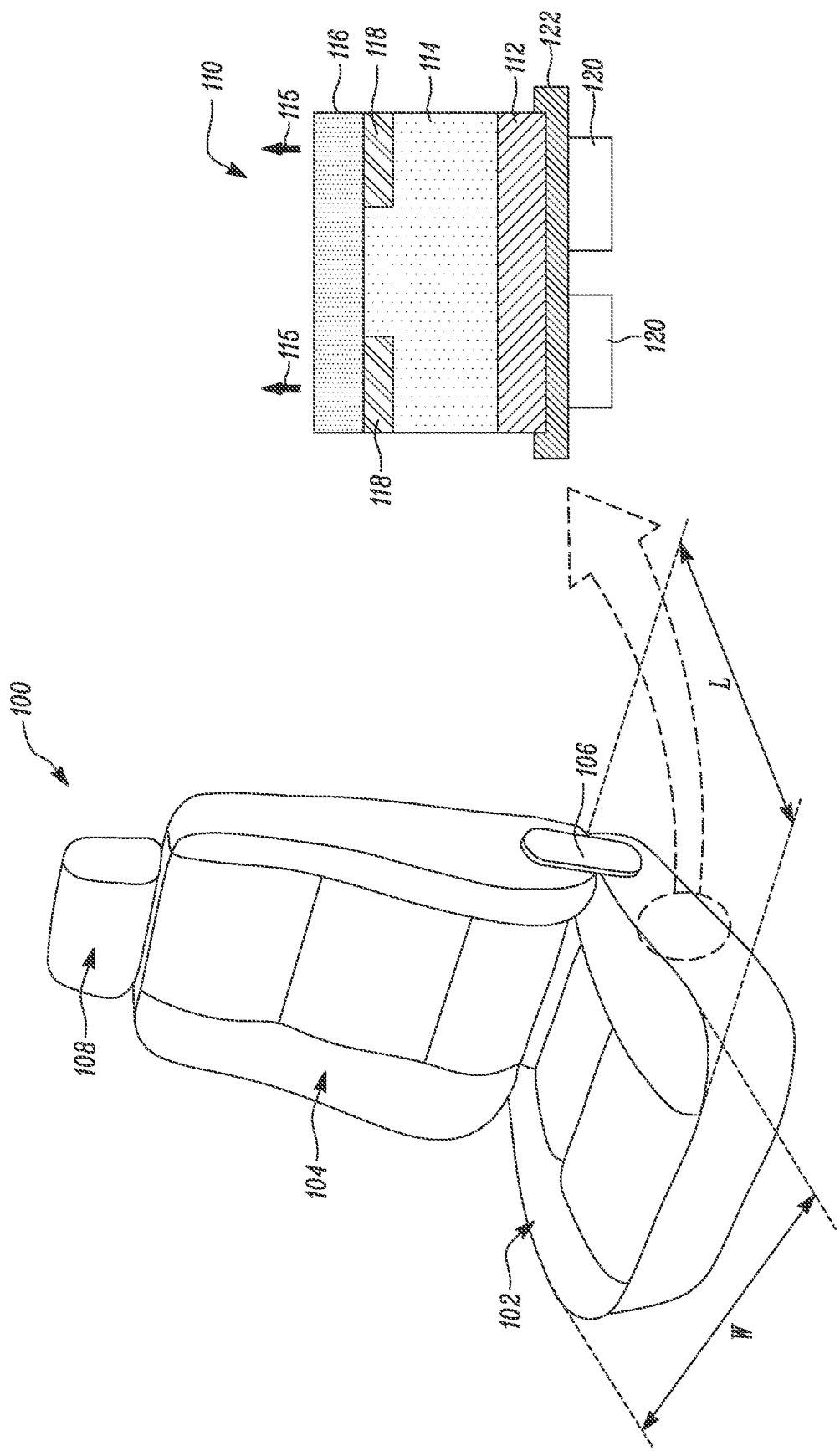
FIG. 1A illustrates a perspective view of an exemplary seat, according to certain embodiments of the current invention.
FIG. 1B illustrates a partial cross-sectional view of a portion of a temperature-control system for the seat, according to certain embodiments of the current invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure relates to a vehicle seat. More particularly, the present disclosure relates to a temperature-control system for the seat associated with the vehicle. The temperature-control system provides cooling and/or heating of one or more portions of any seat in a vehicle, such as a driver seat, a co-passenger seat, a rear passenger seat, a bench-type passenger seat, or other seat. The temperature-control system includes a number of components, such as multiple layers of different materials, a fluid pump, and a heating element, working together to provide active cooling and/or heating of the seat.

The temperature-control system provides a low cost, low noise, power efficient, and effective method for cooling and/or heating of the seat. The temperature-control system may be incorporated in a seat having any size and/or shape associated with the vehicle. Reference will now be made in detail to specific aspects or features, examples of which are illustrated in the accompanying drawings. Wherever possible, corresponding or similar reference numbers will be used throughout the drawings to refer to the same or corresponding parts.

FIG. 1A shows a perspective view of an exemplary seat 100. The seat 100 includes a seating portion 102. The seating portion 102 provides a seating surface for an occupant. The seat 100 also includes a backrest portion 104. The backrest portion 104 may be coupled to the seat 100 portion via a hinge joint 106. The backrest portion 104 provides a back support to the occupant seated on the seating portion 102. Additionally, the seat 100 also includes a headrest portion 108. The headrest portion 108 may be coupled to the backrest portion 104. The headrest portion 108 provides a head support to the occupant seated on the seating portion 102. In some embodiments, the headrest portion 108 may be integrally formed with the backrest portion 104.

The seat 100 further includes a temperature-control system 110. FIG. 1B is a partial cross-sectional view of the temperature-control system 110. The temperature-control system 110 may be referred to as the "system 110." In the illustrated embodiment, the system 110 will be described with reference to the seating portion 102. The system 110 may be, additionally or optionally, employed within the backrest portion 104 and/or the headrest portion 108. The system 110 includes a base layer 112. The base layer 112 extends at least partially along a width "W" and a length "L" of the seating portion 102. The base layer 112 may be made from a polymer foam, a polymer wire mesh, or another suitable material. In some embodiments, the base layer 112 is made using a cushion foam, a nylon wire mesh, or another non-metallic material.

The system 110 includes an intermediate layer 114. The intermediate layer 114 is disposed adjacent to the base layer 112. The intermediate layer 114 extends at least partially along the width "W" and the length "L" of the seating portion 102. The intermediate layer 114 includes a substantially porous configuration, for example a continuous network of pores. The intermediate layer 114 allows fluid to flow through it. In the illustrated embodiment, the fluid flow is substantially perpendicular to the intermediate layer 114, as shown by arrows 115. The intermediate layer 114 may be made of a polymer foam, a polymer mesh, a polymer wire mesh, a metallic mesh, a metallic wool, a wire mesh, or another suitable material. In some embodiments, the intermediate layer 112 may be made of an aluminum mesh, an aluminum wire mesh, a nylon wire mesh, a steel wool, or another mesh. The intermediate layer 114 may be manufactured using standard methods, including a sol-gel process or another process.

The system 110 includes a cover layer 116. The cover layer 116 is disposed adjacent to the intermediate layer 114. The cover layer 116 extends along the width "W" and the length "L" of the seating portion 102. The cover layer 116 encloses the intermediate layer 114 therein. The cover layer 116 may be made of leather, a synthetic leather, a fabric, a polymer foam, or another suitable material. In an embodiment, the cover layer 116 is a leather or synthetic leather with a foam.

The system 110 includes heating elements 118 disposed between the intermediate layer 114 and the cover layer 116. In FIG. 1B, two heating elements 118 are shown. In other embodiments, there is one heating element 118. In other embodiments, there are multiple heating elements 118. Each heating element 118 is spaced apart from another. Each heating element 118 provides heat to the seating portion 102 to increase its temperature. Each heating element 118 may be an electrically powered heating element, a copper-based heating element, a heat pipe, or another heating element.

Figure 2A:
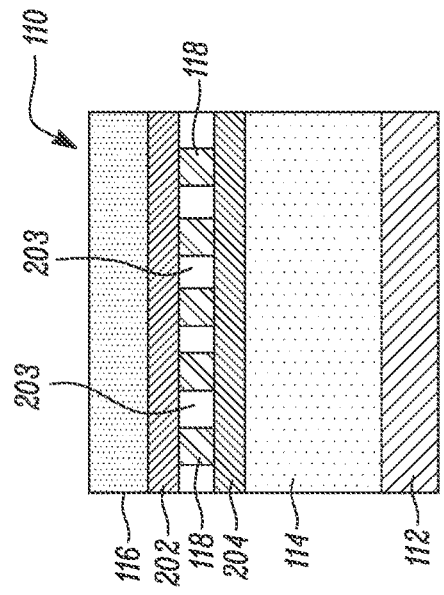
FIGS. 2A to 2D illustrate different partial cross-sectional views of the portion of the temperature-control system, according to certain embodiments of the current invention.
Figure 2B:
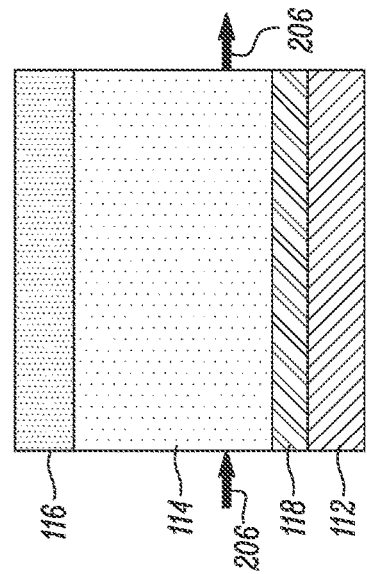

As shown in the embodiment illustrated in FIG. 2A, the system 110 includes the base layer 112, the intermediate layer 114, the cover layer 116, and the heating elements 118. Fluid flow is substantially parallel to the intermediate layer 114, as shown by arrows 208. In some embodiments, a distribution layer 202 is associated with each heating element 118. The distribution layer 202 may provide substantially even distribution of heat generated by each of the heating elements 118. The distribution layer 202 may be made of a metal, a conductive polymer, or another thermally-conductive material that distributes heat.

Further, a gap 203 may separate heating elements 118 and may allow air to flow, improving heat distribution. Each heating element 118 may also include an insulating layer 204 to thermally or electrically insulate the heating element 118 from other areas within the layer or other components. In embodiments, the insulating layer 204 allows for the distribution of heat towards the cover layer 116 and limits the spread of heat to other portions of the system 110, such as the intermediate layer 114 and/or the base layer 112. The insulating layer 204 may be a polymer, rubber, or another insulating material. The heating elements 118, the distribution layer 202, and/or the insulation layer 204 may be disposed non-continuously across the width "W" and the length "L" of the seating portion 102.

Figure 2C:
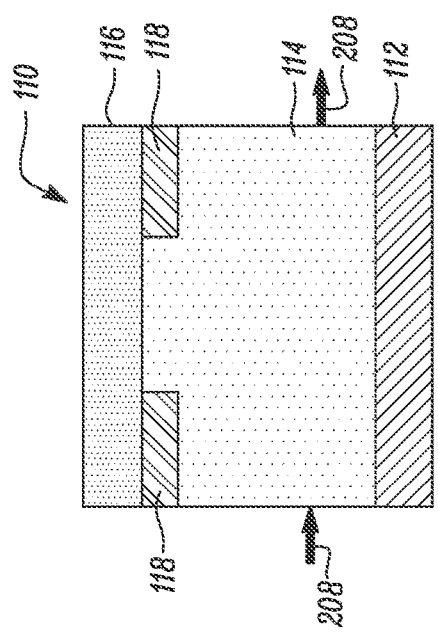
Figure 2D:
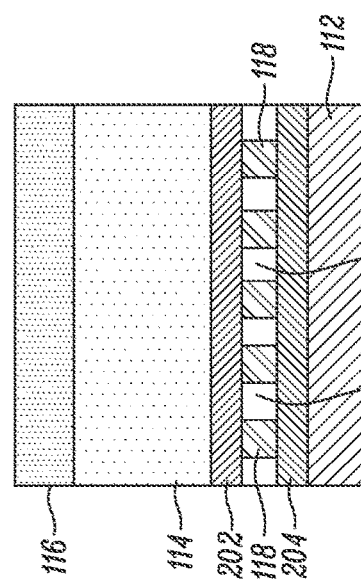

As shown in the embodiment of FIG. 2C, each of the heating elements 118, the distribution layer 202, and/or the insulation layer 204 are disposed between the base layer 112 and the intermediate layer 114. In some embodiments, such as the one shown in FIG. 2D, the heating element 118 includes a single heating element 118. In other embodiments, there are multiple heating elements 118. The heating elements 118 may be disposed between the base layer 112 and the intermediate layer 114. In the illustrated embodiments of FIGS. 2C and 2D, the flow of the fluid is substantially parallel to the intermediate layer 114, as shown by arrows 206. In other embodiments, the flow of the fluid may be in any direction, such as perpendicular to the intermediate layer 114, based on application requirements.

As shown in FIG. 1B, the system 110 includes one or more fluid pumps 120. Each fluid pump 120 provides fluid that flows through the intermediate layer 114. In embodiments, the fluid is water. In other embodiments, the fluid is an aqueous-based coolant. In such a situation, the fluid pump 120 is a liquid pump. In embodiments, the fluid is air. In such a situation, the fluid pump 120 is an air pump. In one embodiment, the fluid pump 120 provides flow of a fluid that has a lower temperature than the seating portion 102. The flow of the fluid cools the seating portion 102 by reducing its overall temperature or the temperature in specific regions where the occupant is seated.

In another embodiment, when the heating elements 118 are active, the flow of the fluid may distribute heat generated by the heating element 118 across the seating portion 102. In another embodiment, the fluid pump 120 provides the flow of the fluid that has a relatively higher temperature with respect to the seating portion 102. In such a situation, the flow of the fluid heats the seating portion 102 by increasing its overall temperature, or the temperature in specific regions where the occupant is seated. In such an embodiment, the heating element 118 may be, optionally, omitted.

The system 110 also includes a support portion 122 disposed adjacent to the seating portion 102 and may be next to the fluid pump 120. The support portion 122 is also disposed adjacent to the base layer 112. The support portion 122 may be made of a metal, a polymer, or another suitable material. In embodiments, the support portion 122 is made from an aluminum sheet or a plastic sheet. Further, the base layer 112 may be partially or fully embedded within the support portion 122. The support portion 122 supports the fluid pump 120 thereon. In embodiments, the fluid pump 120 is connected to a frame (not shown) of the seat 100 or a chassis (not shown) of the vehicle. In such a situation, the support portion 122 may be omitted.

Figure 3C:
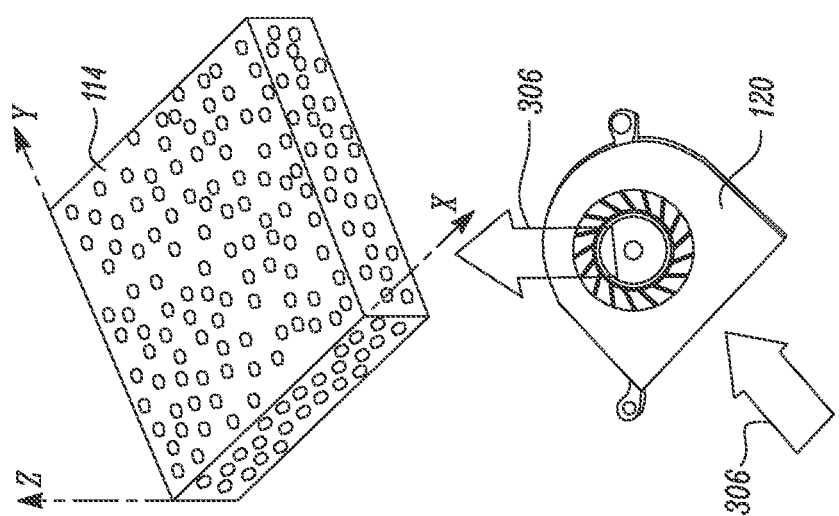
FIGS. 3A to 3C illustrate different partial perspective views of another portion of the temperature-control system, according to certain embodiments of the current invention.
Figure 3B:
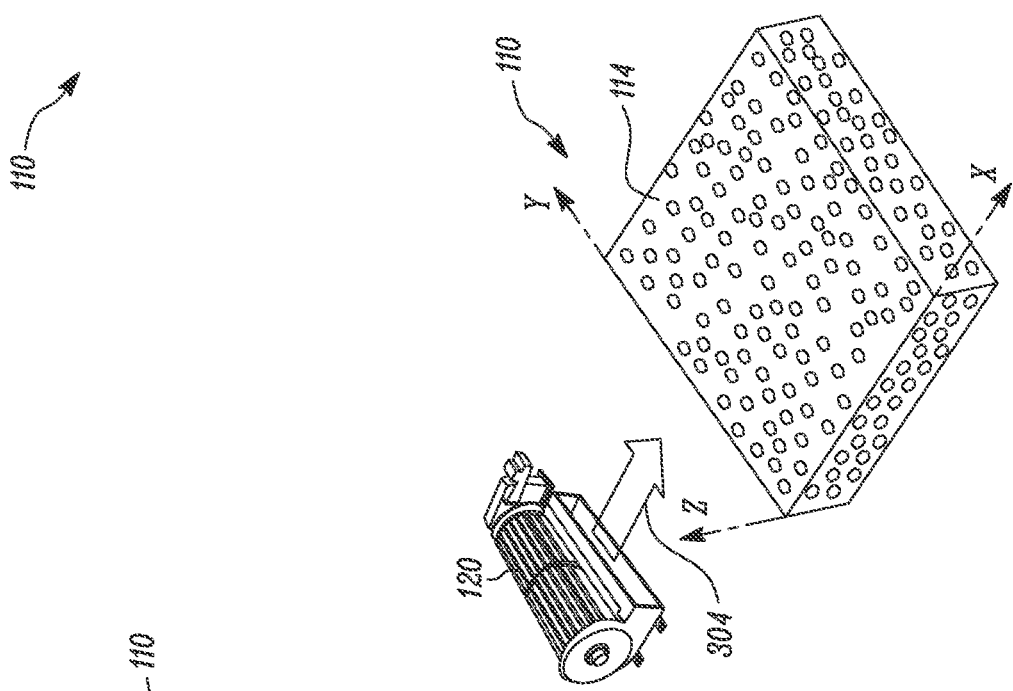
Figure 3A:
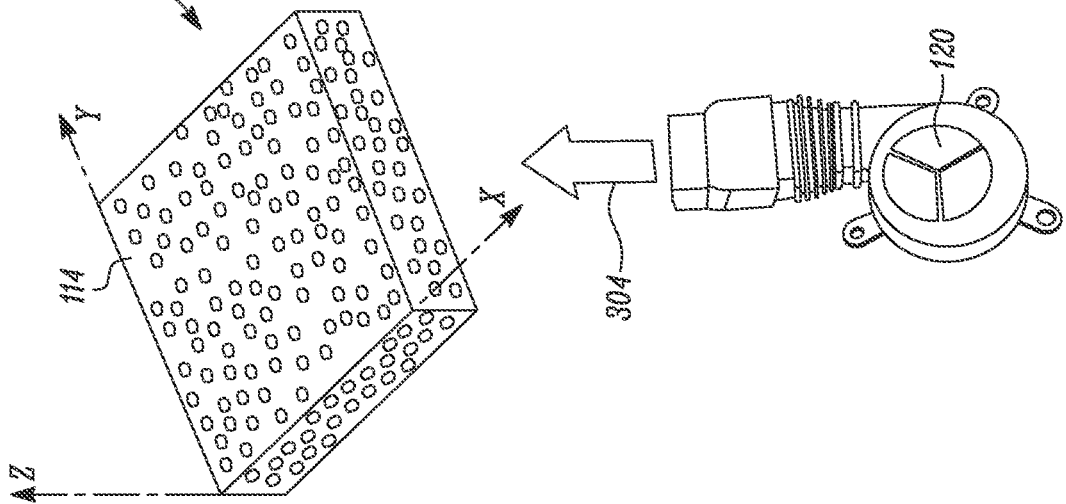

FIGS. 3A to 3C illustrate different configurations of the fluid pump 120. Different layers of material, such as the base layer 112, the cover layer 116, the heating elements 118, the support portion 122, and other elements, are not shown in FIGS. 3A to 3C for the purposes of clarity and explanation. The fluid pump 120 may be a centrifugal type fluid pump as shown in FIG. 3A. In an embodiment, the flow of the fluid is transverse to an X-Y plane of the intermediate layer 114, as shown by an arrow 302. The fluid pump 120 may be a cross-flow fluid pump as shown in FIG. 3B. The fluid flow may be parallel to the X-Y plane of the intermediate layer 114, as shown by an arrow 304.

The fluid pump 120 may be a radial inlet-axial outlet type fluid pump as shown in FIG. 3C. The flow of the fluid may be transverse with respect to the X-Y plane of the intermediate layer 114, as shown by arrows 304. The flow of the fluid with respect to the X-Y plane or any other plane associated with the intermediate layer 114 may vary irrespective of the type of the fluid pump 120. The fluid pump 120 may provide the flow of the fluid in order to overcome a pressure drop through the intermediate layer 114. The intermediate layer 114 may be highly permeable in order to provide low pressure drop to the flow of the fluid during compression thereof when the occupant may be seated on the seating portion 104.

Figure 4:
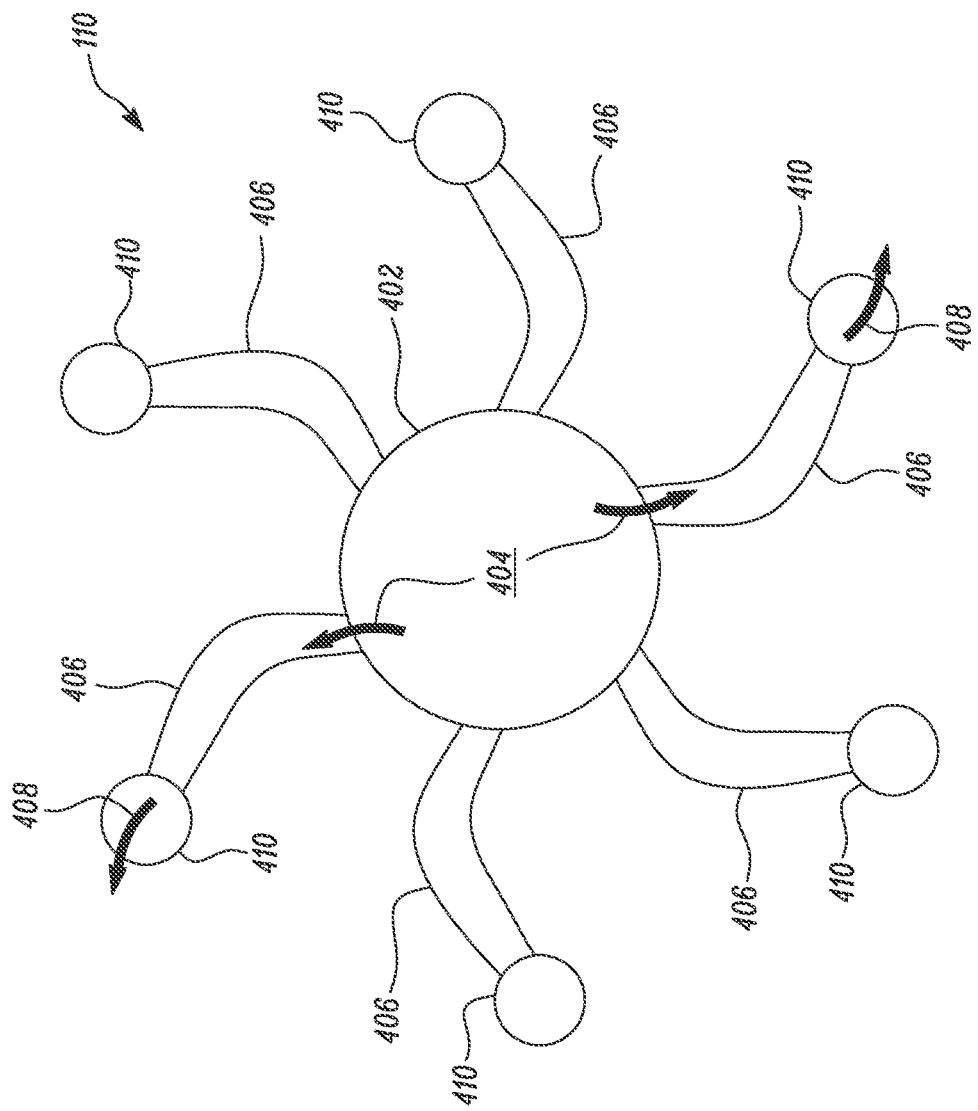
FIG. 4 illustrates a partial top view of another portion of the temperature-control system, according to certain embodiments of the current invention.

FIG. 4 illustrates a top view of another portion of the system 110. In some embodiments, the system 110 includes one or more conduits 402. The conduit 402 is disposed substantially perpendicular with respect to the seating portion 102. The conduit 402 is connected to the fluid pump 120. The conduit 402 allows the flow of the fluid therethrough, as shown by arrows 404. The system 110 further includes a plurality of auxiliary conduits 406 and openings 410 connected to the conduit 402 through which the fluid may flow. Each of the plurality of auxiliary conduits 406 and openings 410 distribute fluid through the intermediate layer 114, as shown by arrows 408. In an embodiment, each of the auxiliary conduits 406 are guide vanes. In embodiments, the plurality of auxiliary conduits 406 includes a pressure-based valve (not shown), such that the pressure-based valve allows the flow of the fluid based on a pressure applied by the occupant on the seating portion 102.

Figure 5B:
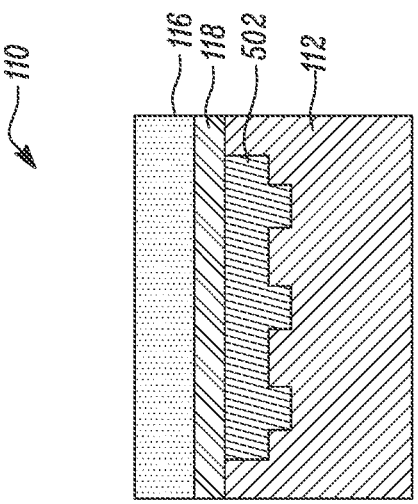
FIGS. 5A and 5B illustrate a partial top view and a partial cross-sectional view, respectively, of another portion of the temperature-control system, according to certain embodiments of the current invention.
Figure 5A:
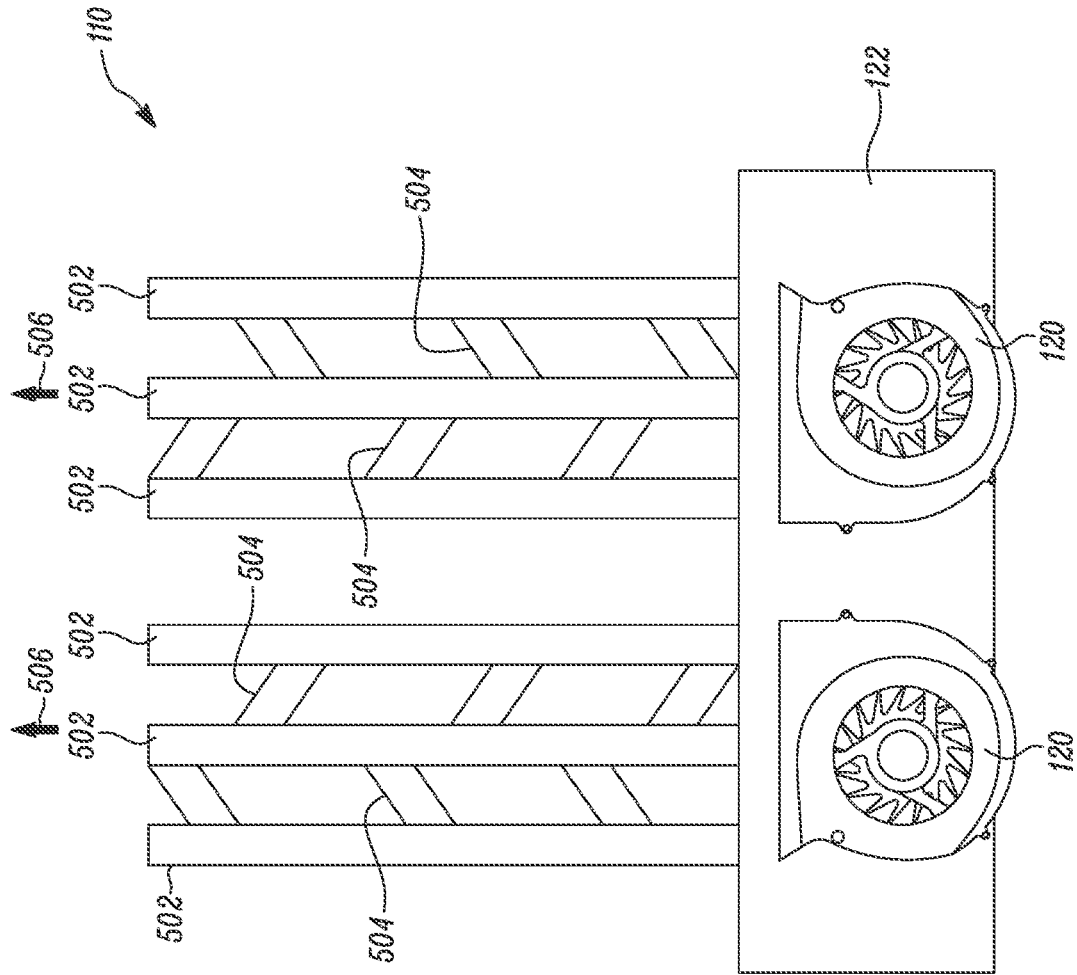

FIG. 5A illustrates a top view of another exemplary configuration of the system 110. In embodiments, the system 110 includes a plurality of conduits 502. Each conduit 502 is spaced apart from one another and substantially parallel to one another. Also, each conduit 502 is substantially perpendicular to the seating portion 102. As shown in FIG. 5A, there are six conduits. In embodiments, there are multiple conduits 502 based on application requirements. Each conduit 502 is connected to the fluid pumps 120.

More specifically, the fluid pumps 120 may be disposed at the front of the seating portion 102, such that the flow of the fluid may exit at the rear of the seating portion 102. Also, each conduit 502 is disposed in the seating portion 102 and extends along the length "L" of the seating portion 102. In some embodiments, when the conduits 502 are disposed within the backrest portion 104, the fluid pumps 120 may be disposed at the bottom of the backrest portion 104, such that the flow of the fluid exits at the top of the backrest portion 104. Also, each conduit 502 may extend parallel to the backrest portion 104. Each conduit 502 provides the flow of the fluid through an extended distance within the seating portion 102 and/or the backrest portion 104. In some embodiments, an aluminum wire mesh is thermally connected to the conduits 502 to improve heat transfer.

Each conduit 502 allows fluid to flow through it, as shown by arrows 506. In embodiments, each conduit 502 includes a pressure-based valve (not shown), such that the pressure-based valve actuates the flow of the fluid based on the pressure applied by the occupant on the seating portion 102. As such, the seating portion 102 may be heated or cooled based on transfer of heat between the fluid and the intermediate layer 114 via each conduit 502. In some embodiments, the conduits 502 includes interconnecting conduits 504 disposed between each conduit 502. The interconnecting conduits 504 provide rigidity to the conduits 502. In embodiments, the interconnecting conduits 504 provide cross flow of fluid between the conduits 502. The conduits 502 and interconnecting conduits 504 may be made of metal, polymer, or another suitable material. In embodiments, one or more conduits 502 or the interconnecting conduit 504 is a heat pipe.

FIG. 5B illustrates a partial cross-sectional view of the system 110 of FIG. 5A. Each conduit 502 is disposed next to the base layer 112. In an embodiment, the conduits 502 are embedded in the base layer 112. The heating element 118 is disposed between the cover layer 116 and the conduits 502 and/or the base layer 112. As illustrated, the intermediate layer 114 is omitted. In other embodiments, the conduits 502 are disposed next to the intermediate layer 114, with the intermediate layer 114 disposed between the cover layer 116 and the base layer 112. The conduits 502 may be disposed next to the base layer 112 or the intermediate layer 114, and the heating element 118 may be disposed between the cover layer 116 and the intermediate layer 114, or the intermediate layer 114 and the base layer 112, based on application requirements.

FIGS. 6A and 6B illustrate top view and partial cross-sectional view, respectively, of another configuration of the system 110. The system 110 includes the conduits 502 and the heating elements 118. As shown, there are four heating elements 118. In embodiments, the heating element 118 includes a single or multiple heating elements 118 based on application requirements. Each heating element 118 is disposed substantially parallel to and spaced apart from one another. The heating elements 118 may also be spaced apart from the conduits 502. Each heating element 118 may be disposed adjacent to each conduit 502. In embodiments, the heating elements 118 are integrally formed with each conduit 502. In other embodiments, the heating elements 118 are woven directly into the conduits 502. For example, as illustrated, each heating element 118 is disposed in a gap 602 provided between the conduits 502.

Figure 7:
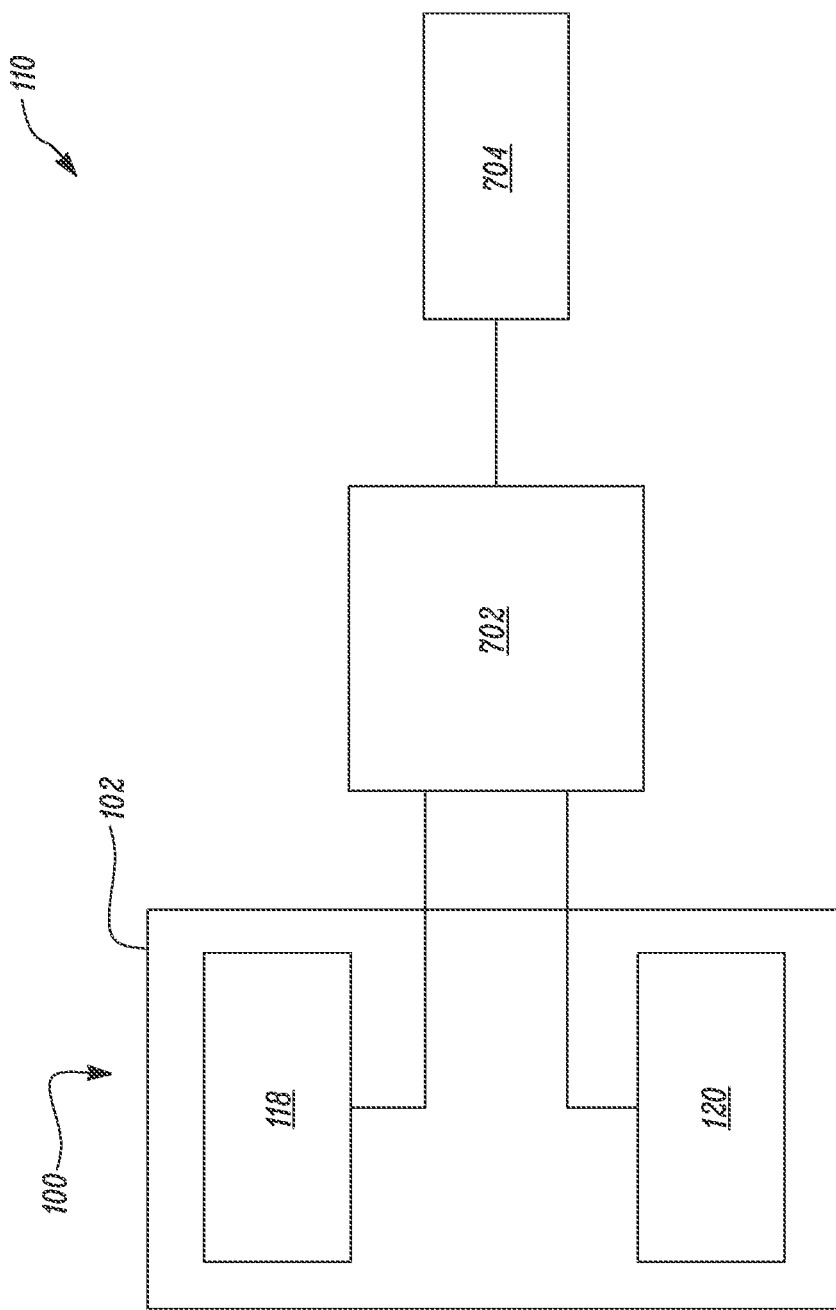
FIG. 7 is a schematic representation of the temperature-control system, according to certain embodiments of the current invention.

FIG. 7 illustrates a schematic representation of the system 110. The system 110 includes the fluid pump 120. In embodiments, the fluid pump 120 is disposed next to the seating portion 102 of the seat 100. In embodiments, the fluid pump 120 is located away from the seat 100. The system 110 also includes the heating element 118 associated with the seating portion 102 of the seat 100. Each of the fluid pump 120 and the heating element 118 is communicably coupled to a controller 702. The controller 702 controls the fluid pump 120 and the heating element 118 based on one or more parameters, such as an occupant input, an ambient temperature, a cabin temperature, a seat temperature, or another parameter. In embodiments, the controller 702 is a dedicated control unit configured to perform functions related to the system 110. In other embodiments, the controller 702 may be an Electronic Control Unit (ECU) associated with the vehicle, or another control unit, configured to perform functions related to the system 110.

Additionally, the system 110 includes a switch 704 communicably coupled to the controller 702. The switch 704 provides an input to the controller 702 in order to control the fluid pump 120 and the heating element 118. In embodiments, the switch 704 is a manual switch adapted to receive the occupant input indicative of actuating the fluid pump 120 and/or the heating element 118. In embodiments, the switch 704 is a temperature-based switch adapted to provide the input indicative of actuating the fluid pump 120 and/or the heating element 118 based on exceeding or dropping of the temperature of the seat 100 beyond a threshold.

In other embodiments, the switch 704 is a pressure-based switch adapted to provide the input indicative of actuating the fluid pump 120 and/or the heating element 118 based on the pressure applied on the seating portion 102 of the seat 100. In such a situation, the switch 704 may be associated with a pressure-based valve element (not shown). The pressure-based valve element may be provided in the seating portion 104 and may be actuated based on the pressure applied by the occupant. The pressure-based valve element may, in turn, actuate the switch 704 to selectively allow the flow of the fluid from the fluid pump 120 or actuate the heating element 118 based on the pressure applied on the seating portion 102 by the occupant.

The system 110 provides a simple, efficient, and cost-effective method of controlling the temperature of the seat 100. The system 110 may be employed with any portion of the seat 100, such as the seating portion 102, the backrest portion 104, and/or the headrest portion 108. The system 110 provides substantially uniform cooling of the seat 100 by employing the intermediate layer 114 and/or the conduit 402, and improved distribution of the cooling/heating. Also, the system 110 controls the temperature of the seat 100 with limited moving components, thus, reducing power consumption, system noise and improving occupant comfort. Also, the system 110 may be retrofitted in any seat 100 with little or no modification to the existing system.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. For example, reference is made to "seat," but a person of ordinary skill in the art will understand that in certain embodiments, one or more other types of seats or seating devices may be substituted. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed seat. It is to be understood that the forms of disclosure herein shown and described are to be taken as representative embodiments.

Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (for example, attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification. It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A vehicle seat, the vehicle seat comprising:
a temperature-control system associated with a portion of a vehicle seat, the temperature-control system comprising:
a fluid pump configured to provide fluid flow;
a plurality of conduits fluidically connected to the fluid pump and extending at least partially into the portion of the vehicle seat;
a plurality of heating elements;
a base layer; and
a continuous insulating layer disposed between the plurality of heating elements and the base layer, the continuous insulating layer separating the plurality of heating elements from the base layer;

wherein each of the plurality of conduits is substantially parallel to a plurality of heating elements.

2. The vehicle seat of claim 1, wherein the plurality of conduits comprises a pressure-based valve configured to regulate a flow of the fluid through the plurality of conduits based at least in part on a pressure applied by an occupant of the vehicle seat.

3. The vehicle seat of claim 1, wherein the temperature-control system further comprises:
a plurality of interconnecting conduits disposed between the plurality of conduits, wherein the plurality of interconnecting conduits are configured to allow cross flow of the fluid between the plurality of conduits.

4. The vehicle seat of claim 1, wherein the plurality of heating elements are integrally formed with the plurality of conduits.

5. The vehicle seat of claim 1, wherein the portion of the vehicle seat is a seating portion.

6. The vehicle seat of claim 1, wherein the portion of the vehicle seat is a backrest portion.

7. The vehicle seat of claim 1, wherein the portion of the vehicle seat comprises a plurality of layers, wherein the plurality of conduits extend at least partially into a first layer of the plurality of layers, and wherein fluid flows into the first layer.

8. The vehicle seat of claim 1, wherein each of the plurality of heating elements are adjacent to the plurality of conduits.

9. The vehicle seat of claim 1 further comprising a cover layer and a distribution layer disposed between the plurality of heating elements and the cover layer.

10. The vehicle seat of claim 9 further comprising an intermediate layer disposed between the distribution layer and the cover layer.

11. The vehicle seat of claim 9, wherein plurality of heating elements are disposed adjacent to an air gap, the distribution layer, and the insulating layer.

12. The vehicle seat of claim 1, the temperature-control system comprising:
a cover layer located above the heating elements;
a distribution layer located between the plurality of heating elements and the cover layer; and
an intermediate layer located between the continuous insulating layer and the base layer such that the continuous insulating layer is above the intermediate layer and the base layer is below the intermediate layer.

13. The vehicle seat of claim 5, wherein the plurality of conduits are substantially parallel to the seating portion.

14. A temperature-control system for a vehicle seat, the temperature-control system comprising:
a fluid pump configured to provide fluid flow; and
a plurality of conduits fluidically connected to the fluid pump and extending at least partially into a portion of the vehicle seat;
a plurality of heating elements;
a base layer; and
a continuous insulating layer located below the plurality of heating elements and located above the base layer, such that the continuous insulating layer separates the plurality of heating elements from the base layer;
wherein each of the plurality of conduits is substantially parallel to a plurality of heating elements.

15. The temperature-control system of claim 14, wherein the plurality of conduits comprises a pressure-based valve configured to regulate a flow of the fluid through the plurality of conduits based at least in part on a pressure applied by an occupant of the vehicle seat.

16. The temperature-control system of claim 14, wherein the temperature-control system further comprises:
a plurality of interconnecting conduits disposed between the plurality of conduits, wherein the plurality of interconnecting conduits are configured to allow cross flow of the fluid between the plurality of conduits.

17. The temperature-control system of claim 14, wherein the plurality of heating elements are integrally formed with and adjacent to the plurality of conduits.

18. The temperature-control system of claim 14, wherein the portion of the vehicle seat comprises a plurality of layers, wherein the plurality of conduits extend at least partially into a first layer of the plurality of layers, and wherein fluid flows into the first layer.

19. The temperature-control system of claim 14, wherein the portion of the vehicle seat is a seating portion and wherein the plurality of conduits are substantially parallel to the seating portion.

20. The temperature-control system of claim 14, wherein each of the plurality of heating elements are adjacent to the plurality of conduits.

* * * * *